Dec. 31, 1963

C. W. REED 3,116,416

RADIATION SCANNER

Filed Nov. 30, 1960

INVENTOR.
CLIFTON W. REED
BY
Lilly & Nyhagen
Attorneys

Dec. 31, 1963  C. W. REED  3,116,416
RADIATION SCANNER
Filed Nov. 30, 1960  2 Sheets-Sheet 2
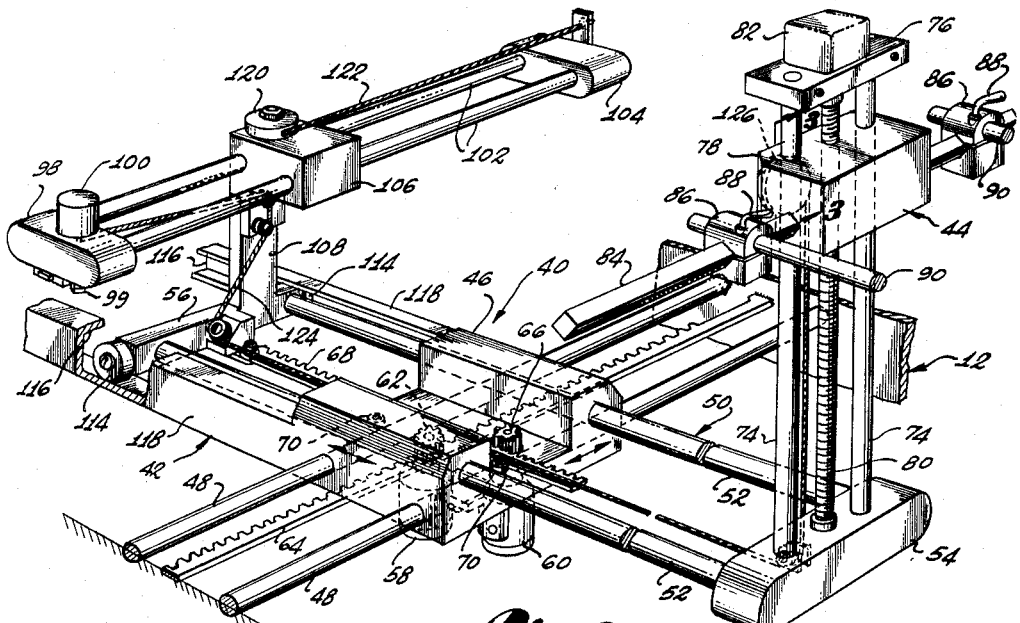
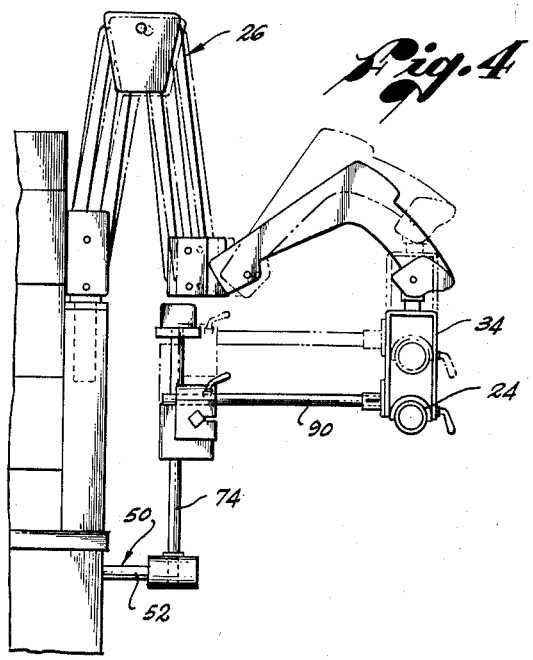
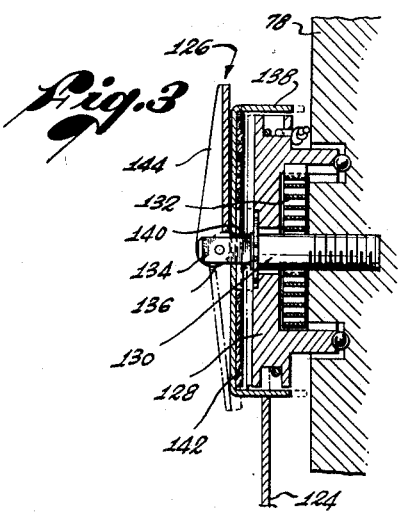
INVENTOR.
CLIFTON W. REED
BY Lilly & Nyhagen
Attorneys

3,116,416
RADIATION SCANNER

Clifton Walter Reed, Redondo Beach, Calif., assignor to C. W. Reed Company, Inc., Los Angeles, Calif., a corporation of California
Filed Nov. 30, 1960, Ser. No. 72,732
10 Claims. (Cl. 250—53)

This invention deals generally with radiation detection equipment and, particularly, with improvements in radiation scanners.

Briefly stated, a radiation scanner comprises a supporting frame structure, a radiation transducer or detector which generates an electrical output in response to impingement of radiant energy on the detector, a means for producing an indication or graphic recording corresponding to the electrical output of the detector, and a means for moving the detector in a desired scanning motion over the object to be scanned. Radiation scanning equipment of this type is widely used in the medical field for diagnoses and research, for example.

The invention will be described and illustrated herein in connection with a medical radiation or nuclear scanner. It will become readily apparent as the description proceeds, however, that the features of the invention are not limited to use in such a nuclear medical scanner but, rather, are susceptible of general application to any type of radiation scanner.

In one type of medical radiation scanning procedure, for example, a patient is fed or injected with a radioactive substance. The patient's body is then scanned with nuclear scanning equipment equipped with means for graphically recording the pattern of the radiations received by the nuclear scanning detector or detectors. In this way, for example, graphic recordings or "pictures" may be made of internal body organs in which the radioactive substance concentrates. Such radiation "pictures" are extremely useful in the diagnosis and treatment of many ailments as well as in medical research.

With the foregoing preliminary discussion in mind, a general object of the invention may be stated as being the provision of an improved radiation scanner of the character described.

A more specific object of the invention is to provide a radiation scanner of the character described in which the radiation scanning detector or detectors are movably supported for horizontal and vertical scanning in a new and unique way which appreciably simplifies and reduces the cost of the equipment, permits maximum scanning travel of the detectors, and produces smooth and uniform scanning motion of the detectors.

Another object of the invention is to provide a radiation scanner of the character described having two radiation detectors which can be used simultaneously for automatic or manual dual detector scanning in vertical and horizontal planes or individually for automatic or manual single detector scanning and which can be individually positioned in selected stationary positions for monitoring radiations from selected areas over a period of time.

A further object of the invention is to provide a radiation scanner of the character described having certain other unique features of construction which result in equipment having a relatively compact and lightweight design, maximum accuracy, and the ability to produce graphic records of radiation patterns having a very high degree of legibility.

Other objects, advantages, and features of the invention will become readily apparent as the description proceeds.

Briefly, the objects of the invention are attained by providing a radiation scanner equipped with a frame, at least one radiation scanning detector, and a movable supporting means on the frame which mounts the detector for movement relative to the frame and supports the entire weight of the detector. A power driven, vertically and horizontally movable carriage assembly on the frame is connected to the detector for moving the latter in its scanning motion.

The arrangement is such that the carriage assembly supports no part of the weight of the detector or detectors. In this way, the carriage assembly and the drive system therefor can have minimum size and strength, the uniformity of scanning movement of the detector and the overall accuracy of the equipment are improved, the cost and size of the equipment are reduced, and legibility of the radiation record produced by the equipment is greatly improved.

The printing or recording head of the instrument is carried on the carriage assembly for movement therewith and travels over a horizontal table that holds the radiation pattern recording medium. The carriage assembly is uniquely supported to assure planar movement of the recording head exactly parallel to the table, as is necessary to a high degree of legibility of the completed radiation record, and yet attain maximum horizontal travel of the carriage assembly. The table is also adjustable to aid in attaining this end.

An other feature of the invention resides in an improved means for moving the recording head in proportion to vertical movement of the detector.

An illustrative nuclear medical scanner embodying the features of the invention will now be described in detail by reference to the attached drawings, wherein:

FIG. 2 is a semidiagrammatic illustration of the carriage assembly of the scanner;

FIG. 3 is an enlarged section taken along line 3—3 on FIG. 1; and

FIG. 4 is a front elevation of the present supporting means for the nuclear detectors of the scanner.

Figure 1:
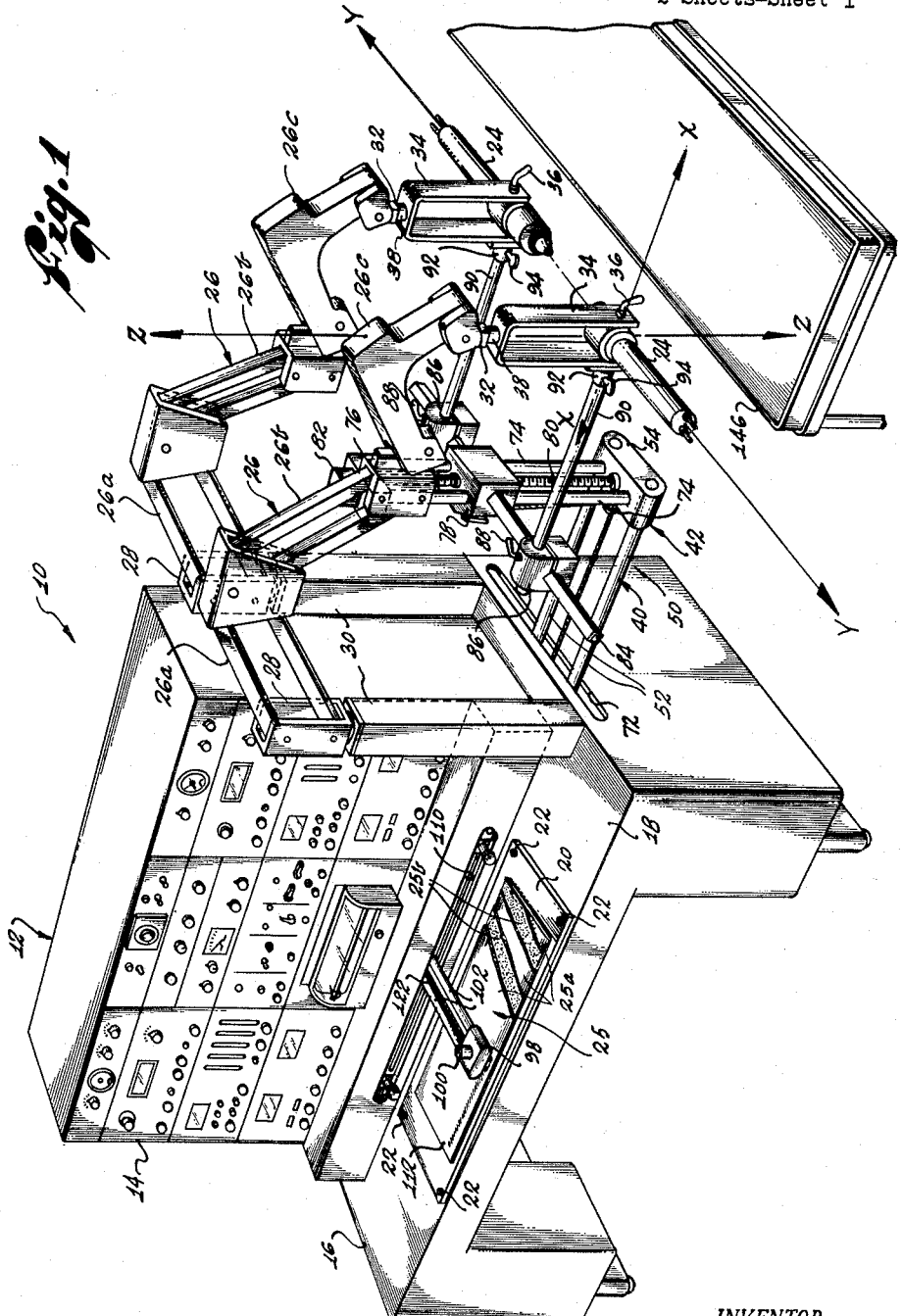
FIG. 1 is a perspective view of the scanner.

The nuclear medical scanner 10 illustrated in these drawings comprises a supporting frame or housing 12 including an upper console unit 14 and a lower base 16. This base has a forward, horizontal platform 18 on which is a table 20. Table 20 is attached to the base platform 18 by means of four adjusting screws 22 at the corners of the table. These screws are adjustable to level the table for reasons to be seen. It is on this table that the radiation recording medium 25 is placed for recording radiation patterns.

The nuclear scanning detectors 24 of the illustrated scanner are two in number and of identical conventional design. Attached to the frame 12 are two conventional counterbalanced supports 26 which mount the detectors 24, respectively, for horizontal and vertical movement with respect to the frame. These supports are identical and each comprises a plurality of arms pivotally connected in end-to-end fashion. The arms are completely counterbalanced by counterbalancing springs, not shown, so that each arm supports the entire weight of its respective detector. The free ends of arms 26a are hinged to end members 28. These end members are rotatably supported on columns 30 on the frame for turning on vertical axes. Pivoted on the free end of each support arm 26c, on an axis parallel to the pivot axes of the arms of the respective support, is an end member 32.

As noted above, the counterbalanced supports 26 are conventional so that no further description thereof is deemed necessary.

Each detector 24 is positioned between the arms of a yoke 34 and is hingably supported on the yoke arms for turning on an axis at right angles thereto. Each detector can be locked in any desired setting by means of a clamp screw 36. Each yoke 34 is rotatably connected, by a swivel joint 38, to the end member 32 of its respective counterbalanced support 26. The swivel axis of each of these joints extends at right angles to the pivot axis of the support arms of the respective counterbalanced support 26 and is normally vertically disposed, as shown. The counterbalanced supports 26 are set so that they carry the entire weight of the detectors 24 and their supporting yokes 34.

Indicated at 40 is a carriage assembly for imparting scanning movement to the detectors 24. The left-hand end of this carriage assembly is enclosed within and concealed by the scanner housing 12 in FIG. 1. For this reason, the entire carriage assembly has been illustrated in semidiagrammatic fashion in FIG. 2. As shown in FIG. 2, the carriage assembly 40 comprises a first, horizontally movable carriage 42 and a second, vertically movable carriage 44. The horizontally movable carriage 42 comprises a rigid carriage member 46 which is slidably mounted on a pair of horizontal guide rods 48. These guide rods are rigidly fixed at opposite ends to frame 12 of the scanner and extend in the fore and aft direction thereof. Slidably mounted in the carriage member 46 is a second carriage member 50 including a pair of parallel, horizontal guide rods 52 which extend slidably through bores in the carriage member 46. Rigidly joining the guide rods 52 at their ends are cross members 54 and 56. The guide rods 52 of the second carriage member 50 extend at right angles to the guide rods 48, as shown, so that the second carriage member moves in the endwise direction of the scanner with respect to the first carriage member 46.

Rigidly mounted on the underside of the first carriage member 46 are two electric motors 58 and 60. Rigid on the shaft of motor 58, below the carriage member 46, is a pinion 62. Pinion 62 meshes with a rack 64 which is fixed at its opposite ends to the scanner frame 12. This rack is located between and extends parallel to the guide rods 48. The first carriage member 46 and the second carriage member 50, therefore, can be driven in the fore and aft direction of the scanner by operation of the motor 58.

The shaft of motor 60 extends through a hole in the carriage member 46 and has rigid thereon a pinion 66. This pinion meshes with a rack 68 located between and extending parallel to the guide rods 52 of the second carriage member 50. One end of the rack 68 is fixed to the cross member 56 of the second carriage member. The rack 68 is retained in meshing engagement with the pinion 66 by means of bearings 70 on the first carriage member 46. Accordingly, the second carriage member 50 can be driven in the endwise direction of the scanner, with respect to the first carriage member 46, by operation of the motor 60.

The right-hand end of the second carriage member 50, as the latter is viewed in FIGS. 1 and 2, extends through a horizontal slot 72 in the right-hand side wall of the scanner base 16. Fixed at their lower ends to the cross member 54 on the exteriorly extending end of the carriage member 50 are a pair of parallel, vertical guide rods 74. The upper ends of the rods are rigidly joined by a cross member 76. The vertically movable carriage 44 comprises a carriage member 78 which is slidable on the guide rods 74. Located between and extending parallel to the guide rods 74 is a lead screw 80 on which the carriage member 78 is threaded. The ends of this lead screw are rotatably supported in the cross members 54 and 76, respectively. A motor 82, mounted on the upper cross member 76, is drivably coupled to the lead screw for rotating the latter in opposite directions. Thus, the carriage member 78 is vertically movable on the guide rods 74 by operation of the motor 82.

Extending through the carriage member 78, at right angles to the guide rods 52 of carriage member 50, is a horizontal supporting bar 84. A pair of clamp blocks 86 are slidably mounted on the extending ends of this supporting bar for adjustment therealong. Each clamp block carries a clamp screw 88 by which the respective block can be clamped in a selected position along the bar.

Extending through each clamp block 86, at right angles to the supporting bar 84, is a horizontal rod 90. The right-hand ends of these rods, as the latter are viewed in FIG. 1, are received in socket members 92 on the detector-supporting yokes 34. Each socket member carries a clamp screw 94 for locking the respective rod 90 to the yoke.

It is evident from the description thus far that motor 60, when energized, drives the detectors 24 in the X direction in FIG. 1, motor 58, when energized, drives the detectors 24 in the Y direction, and motor 82, when energized, drives the detectors in the Z direction. The three motors are controlled by circuits (not shown) within the console unit 14. These circuits are conventional and form no part of the present invention. Accordingly, the circuits will not be described. Suffice it to say that the motor control circuits can be set from the front of the console unit to produce uniform horizontal scanning movement of the detectors 24 in the X and Y directions, by synchronized operation of motors 58 and 60, or uniform vertical scanning movement of the detectors in the X and Z directions, by synchronized operation of motors 60 and 82. When the console unit is set for horizontal scanning, for example, the X direction motor 60 is alternately energized, first in one direction and then the reverse direction, to produce alternate right- and left-hand travel of the detectors in the X direction between preset limits. At each right- and left-hand limit of movement of the detectors, motor 60 is momentarily de-energized and the Y direction motor 58 is pulsed to step the detectors a preset distance in the Y direction. Thus, the detectors are driven in a horizontal, rectangular scanning pattern.

When the console unit 14 is set for vertical scanning, the X direction motor 60 is alternately energized in opposite directions to produce alternate right- and left-hand travel of the detectors as just described in connection with horizontal scanning. The Z direction motor 82 is pulsed at each right- and left-hand limit of movement of the detectors to step the latter upwardly a preset distance in the Z direction. In vertical scanning, then, the detectors are moved in a vertical, rectangular scanning pattern.

A primary feature of the invention resides in the fact that the entire weight of the detectors 24 and their supporting yokes 34 is carried by the counterbalanced supports 26. In this way, the carriage assembly 40 supports no part of the weight of the detectors. As a result, the carriage assembly need have only sufficient rigidity to support its own weight. This is highly important since the unsupported, right-hand end of the carriage member 50, when extended to its extreme right-hand limit of travel, projects a substantial distance beyond the scanner frame 12. If the weight of the detectors were carried by this carriage member, the latter, and the entire carriage assembly, would have to be strengthened appreciably, thereby increasing the size, weight, complexity, and cost of the scanner. By supporting the entire weight of the detectors on the counterbalanced supports 26, in accordance with the present invention, and using the carriage assembly only as a means to move the detectors, the assembly can have the lightweight construction illustrated in the drawings. This lightweight carriage construction, in turn, results in a scanner of minimum size, weight, complexity, and cost. Further, the present lightweight, counterbalanced design results in smoother, more uniform scanning movement of the detectors.

Indicated at 98 is a printing or recording head which reproduces on a radiation recording medium 25 the pattern of the radiations incident on the detectors 24. This recording head comprises a sharp edged, spring loaded recording stylus 99 and a solenoid 100 for actuating the stylus against the recording medium 25 to mark the latter. As shown in FIG. 1, the radiation recording medium 25 comprises alternate sheets of white paper 25a and carbon paper 25b. Thus, each time the recording stylus 99 strikes the top sheet 25a, a short line is impressed on the top sheet and a dark line is produced on the underlying sheets 25a by the carbon paper 25b.

Solenoid 100 is electrically connected to the detectors 24 by radiation counting circuitry (not shown) within the console unit 14 in such a way that the frequency of actuation of the stylus 99 against the recording medium 25 is proportional to the rate of incidence of the radiations on the detectors. This circuitry is conventional and forms no part of this invention so that no detailed description thereof is deemed necessary.

Recording head 98 is fixedly mounted on one end of a supporting arm comprising a pair of guide rods 102. The other ends of these guide rods are rigidly connected by a cross member 104. Guide rods 102 extend slidably through a guide block 106. This block is rigid on the upper end of a member 108, the lower end of which is integral with the cross member 56 of carriage member 50. The guide rods 102 are horizontally disposed and extend at right angles to the guide rods 52 of the latter carriage member.

In FIG. 1, these guide rods 102 will be seen to extend through a slot 110 in the front side of the console unit 14 so as to support the recording head 98 directly over the table 20 and the recording medium 25.

From this description, it is evident that the recording head 98 moves with the detectors 24 when the latter are driven in the X and Y directions, in the manner described earlier. Thus, when the scanner is set for horizontal scanning, the recording head 98 moves over the radiation recording medium 25 in the same rectangular pattern as the horizontal scanning pattern of the detectors. During each right- and left-hand movement of the recording head with the detectors in the X direction, the recording stylus is actuated against the recording medium 25 to produce rows 112 of parallel lines, the spacing between which varies in proportion to variations in the rate of incidence of radiations on the detectors 24. When the rate of incidence of radiations on the detectors is high, therefore, the lines produced on the recording medium by the recording stylus 99 are close together and form dark areas. The completed radiation record, therefore, displays the pattern of the radiations incident on the detectors during movement of the latter through their scanning pattern.

In order to assure maximum legibility of the radiation pattern produced on the recording medium, it is necessary that the recording head 98 move in a plane which is exactly parallel to the upper surface of the table 20. For this reason, the table 20 is secured to the scanner base 16 by the adjusting screws 22, mentioned earlier, which permit the table to be adjusted into parallelism with the plane of movement of the recording head 98. Moreover, in order to assure that the recording head will undergo planar rather than arcuate movement during movement of the carriage member 50 in the X direction, the left-hand end of the latter member, as it is viewed in FIG. 2, mounts guide rollers 114 which ride in guide channels 116 formed in a pair of rigid, parallel guide extensions 118 on the carriage member 46. In this way, the left-hand end of the carriage member 50 is restrained against dropping under its own weight as the carriage member is moved to the left in the X direction with respect to the carriage member 46. Movement of the recording head 98 over the recording medium 25 in a plane exactly parallel to the table 20 is thereby attained. This supporting arrangement for the carriage member 50 and recording head 98 is a second highly important feature of the invention.

Thus far, we have seen how the recording head 98 moves over the radiation recording medium 25 during horizontal scanning movement of the detectors. Movement of the recording head over the recording medium 25 during vertical scanning movement of the detectors is accomplished as follows: Indicated at 120 is a spring loaded drum on the recording head guide block 106. A cable 122, wound on this drum, is connected at one end to the end member 104 on the recording head guide rods 102. The drum and cable, therefore, act to urge the recording head to its forward limiting position on the carriage assembly, i.e., to the left in FIG. 2. The recording head 98 is moved rearwardly against the action of the spring loaded drum 120, i.e., to the right in FIG. 2, by means of a cable 124 which is connected at one end to the recording head 98, as shown, and at its other end to the vertically movable carriage member 78. This latter cable passes around guide rollers, as shown, so that upward movement of the carriage member 78, in the Z direction, pulls the recording head 98 rearwardly against the action of the spring loaded drum 120.

Another feature of the present invention resides in the unique clamp means 126 for adjustably securing the cable 124 to the carriage member 78. This clamp means comprises a drum 128 which is rotatably supported on an axle 130 rigid on the carriage member 78. A coil spring 132 is connected between the axle 130 and drum 128 and urges the latter in a direction to wind the cable 124 on the drum 128.

Axle 130 has a squared, outer end 134. Fitting over the drum 128, and having a squared opening 136 slidably fitting on the squared end 134 of the axle, is a cylindrical cover 138. A spring 140, acting between the axle 130 and cover 138, urges the latter away from the drum 128. Bonded to the inner side of the cover 138 is a brake disc 142 of friction material. An eccentric lever 144 is pivotally supported on the squared end 134 of the axle, outwardly of the cover 138, for urging the brake disc 142 against the pulley 128, to brake the latter against rotation, when the eccentric lever 144 is rotated from its full line position to its phantom line position in FIG. 3. When this lever is in its full line position, the brake disc 142 is disengaged from the pulley 128 so that the latter is free to turn.

From this description, it is evident that when the clamp lever 144 is in its full line, released position, the carriage member 78 can be freely adjusted up or down in the Z direction without moving the recording head 98. During this vertical movement of the carriage member 78, the cable 124 merely winds on or unwinds from the clamp drum 128. At any selected vertical position of the carriage member 78, the clamp lever 144 can be swung to its phantom line position in FIG. 3 to lock the clamp drum 128 against rotation. With the drum 128 thus clamped against rotation, upward movement of the carriage member 78 pulls the recording head rearwardly on the carriage assembly while downward movement of the carriage member 78 results in forward movement of the recording head on the carriage assembly under the action of the spring loaded drum 120. It is evident, therefore, that the recording head moves to the right and left and is intermittently stepped forwardly or rearwardly over the recording medium 25 during movement of the detectors 24 in their vertical scanning pattern. During this vertical scanning, of course, the recording stylus 99 is actuated against the recording medium at a frequency proportional to the rate of incidence of the radiations on the detectors so as to produce on the medium a recording of the radiation pattern as before. The releasable clamp 126 permits the detectors 24 to be set at any selected level for horizontal scanning and at any selected initial level for vertical scanning.

In use of the scanner, a subject who has been fed or injected with a radioactive substance is placed on a cot 146 either in a prone or upright position. The detectors 24 are then driven, in either their horizontal or vertical scanning pattern, so as to scan a selected portion of the subject's body. The recording head 98 reproduces on the radiation recording medium 25 the pattern of the radiations incident on the detectors as the latter scan the selected portion of the subject's body. The completed radiation record, then, affords a "picture" of concentrations of the radioactive material within the subject's body in the well-known way. The three primary features of the invention, namely, the counterbalanced supports for the detectors, which remove the weight of the detectors from the carriage assembly, the guides 114, 116 for assuring planar movement of the recording head over and parallel to the table 20 and the recording medium 25, and the unique clamp arrangement 126 for operatively connecting the recording head and carriage member 78 for vertical scanning, contribute to attaining a radiation record having maximum legibility.

Obviously, one or both detectors can be quickly and easily disconnected from the carriage to enable manual scanning of one or both detectors as well as independent stationary positioning of the detectors.

It is evident that many different kinds of movable supporting means, other than counterbalanced supports, may be employed to carry the weight of the nuclear detectors 24. For example, each detector might be mounted on the lower end of an upright, pendulum-like supporting arm which is hinged at its upper end to the scanner frame. In this case, the detectors would undergo an arcuate horizontal scanning movement in the X direction. Scanning movement of the detectors in the Y and Z directions would be accomplished by shifting the frame part on which the arm is swingably supported. Otherwise, the detectors might be supported for movement in the X direction by a carriage movable along a rigid horizontal supporting rail mounted at one end on the scanner frame. Here, movement of the detectors in the Y and Z directions would be accomplished by shifting the rail. The weight of the detectors can also be carried in numerous other ways.

It is evident, therefore, that the invention herein described and illustrated is fully capable of attaining the objects and advantages preliminarily set forth.

What is claimed is:

1. In a radiation detector, the combination comprising:
   a stationary supporting frame having a horizontal chart table,
   a horizontal carriage supported on said frame at the approximate level of said table for horizontal movement between a position of extension of one end of the carriage a substantial distance beyond the frame and a position of retraction of said one end of the carriage close to the frame,
   a horizontal arm on said frame extending over said table,
   a recording head on said arm over said table,
   a radiation detector attached to said one end of said carriage for horizontal movement with the latter and electrically connected to said recording head to actuate the latter,
   means for moving said carriage between said positions,
   a counterbalanced support a distance above said carriage supporting said detector on said frame for horizontal movement of the detector with said carriage, said support including a series of counterbalanced arms pivotally connected in end-to-end relation and pivotally connected at one end to said frame a distance above said carriage and at the other end to said detector,
   said detector being located beyond and above said one end of said carriage and below said other end of said arms so as to be adapted for scanning a subject located beyond said one end of and approximately at the level of said carriage, and
   said arms being counterbalanced to support the entire weight of the arms themselves and the weight of the detector during horizontal movement of the latter with said carriage.

2. In a radiation detector, the combination comprising:
   a stationary supporting frame having a horizontal chart table,
   a horizontal first carriage supported on said frame at the approximate level of said table for horizontal movement between a position of extension of one end of said carriage a substantial distance beyond said frame and a position of retraction of said one end of the carriage close to the frame,
   a horizontal arm on said frame extending over said table,
   a recording head on said arm over said table,
   a second carriage mounted on said one end of said first carriage for vertical movement with respect to said first carriage,
   means for horizontally moving said first carriage between said positions,
   means on said one end of said first carriage for vertically driving said second carriage up and down,
   a radiation detector attached to said second carriage for horizontal movement with said first carriage and vertical movement with said second carriage,
   a counterbalanced support supporting said detector on said frame for horizontal movement of the detector with said first carriage and vertical movement of said detector with said second carriage including a series of counterbalanced arms pivotally connected in end-to-end relation and pivotally connected at one end to the frame and at the other end to the detector, and
   said arms being counterbalanced to support the entire weight of the arms themselves and the weight of said detector during horizontal and vertical movement of the latter with said carriages.

3. In a radiation scanner, the combination comprising:
   a supporting frame,
   a carriage mounted on said frame for horizontal movement between a position of horizontal extension of one end of the carriage a substantial distance beyond said frame and a position of retraction of said one end of the carriage close to the frame,
   a pair of counterbalanced supports over said carriage, each including a series of counterbalanced arms pivotally connected in end-to-end relation and pivotally connected at one end to said frame above and at opposite sides of said carriage for horizontal movement of the other end of each series of arms with respect to the frame,
   a pair of radiation detectors, and
   means connecting each detector to said one end of said carriage and to said other end of one of said series of arms for horizontal movement of each detector with said carriage and adjustment of the position of each detector with respect to the carriage.

4. In a radiation detector, the combination comprising:
   a stationary supporting frame having a horizontal chart table,
   a horizontal carriage mounted on said frame at the approximate level of said table for horizontal movement between a position of extension of one end of the carriage a substantial distance beyond the frame and a position of retraction of said one end of the carriage close to the frame,
   a horizontal arm on said frame extending over said table,
   a recording head on said arm over said table,
   means for horizontally moving said carriage between said positions,
   a second, vertically movable carriage on said one end of said first carriage,
   means on said one end of said first carriage for driving said second carriage up and down,
   a pair of counterbalanced supports over said carriages, each including a series of counterbalanced arms pivotally connected in end-to-end relation and pivotally connected at one end to said frame a distance above said first carriage for horizontal and vertical movement of the other end of each series of arms with respect to the frame, a pair of radiation detectors, means connecting each detector to said second carriage and to said other end of one of said series of arms for horizontal and vertical movement of each detector with said carriages and adjustment of the position of each detector with respect to the carriages, and each of said series of arms being counterbalanced to support the entire weight of the respective arms and the weight of the detector connected to said other end of the respective arms during horizontal and vertical movement of each detector with said carriages.

5. In a radiation scanner, the combination comprising:

a supporting frame, a first carriage mounted on said frame for horizontal movement along a given direction line, a second carriage mounted on said first carriage for horizontal movement along a direction line normal to said first direction line and between a position of horizontal extension at one end of said second carriage a substantial distance beyond said frame and a position of retraction of said one end of said second carriage close to said frame, a pair of radiation detectors mounted on said one end of said second carriage, a pair of counterbalanced supports over said second carriage, each including a series of counterbalanced arms pivotally connected in end-to-end relation and connected at one end to said frame above said second carriage and in approximate vertical alignment with the limits of horizontal travel of said first carriage for turning of each support on a vertical axis and pivoting of each support on a horizontal axis normal to its respective arms and connected at the other end to said detectors, respectively, for turning of each detector on a vertical axis with respect to its respective arms and pivoting of each detector with respect to its respective arms on a horizontal axis parallel to said first-mentioned horizontal axis of its respective arms, and each series of arms being counterbalanced to support the weight of the respective arms and the weight of the detector connected to the respective arms during movement of the respective detector with said second carriage.

6. In a radiation scanner, the combination comprising:

a supporting frame, a first carriage mounted on said frame for horizontal movement along a first direction line, a second carriage mounted on said first carriage for horizontal movement along a second direction line normal to said first direction line and between a position of horizontal extension of one end of said second carriage a substantial distance beyond said frame and a position of retraction of said one end of the second carriage close to said frame, a third, vertically movable carriage on said one end of said second carriage, means for moving said first carriage, means for moving said second carriage on said first carriage, means for vertically moving said third carriage, a pair of radiation detectors connected to said third carriage for vertical and horizontal movement with the latter carriage, a pair of counterbalanced supports, each including a series of counterbalanced arms pivotally connected in end-to-end relation and connected at one end to said frame for turning on a vertical axis and pivoting on a horizontal axis normal to the arms and connected at the other end to a detector for turning with respect to the latter on a normal vertical axis and pivoting with respect to the latter detector on an axis parallel to said first-mentioned pivot axis, and each series of arms being counterbalanced to support the weight of the respective arms and the weight of the detector connected to the respective arms during movement of the respective detector with said third carriage.

7. In a radiation scanner, the combination comprising:

a supporting frame, a horizontal table on said frame, a first carriage mounted on said frame for horizontal movement along a given direction line, a horizontal arm slidably mounted for horizontal, longitudinal movement on said carriage along a direction line transverse to said first-mentioned direction line, one end of said arm extending over said table, a recording head mounted on said end of said arm, a second carriage mounted on said first carriage for vertical movement with respect to the first carriage, a radiation detector mounted on said second carriage for vertical and horizontal movement therewith, means for horizontally moving said first carriage, means for vertically moving said second carriage, and means for longitudinally moving said arm on said first carriage in proportion to vertical movement of said second carriage including a cable extending between said recording head and said second carriage and secured at one end to said recording head, a cable clamp on said second carriage which is releasable to permit vertical adjustment of said second carriage independently of said recording head and which is thereafter settable to lock said second carriage to said cable so that vertical movement of said second carriage imparts longitudinal movement to said arm and said recording head thereon in one direction, and spring means acting between said first carriage and said arm for urging the latter in the opposite longitudinal direction.

8. In a radiation scanner, the combination comprising:

a supporting frame, a horizontal table on said frame, a first carriage mounted on said frame for horizontal movement along a given direction line, a horizontal arm slidably mounted for horizontal, longitudinal movement on said carriage along a direction line transverse to said first-mentioned direction line, one end of said arm extending over said table, a recording head mounted on said end of said arm, a second carriage mounted on said first carriage for vertical movement with respect to the first carriage, a radiation detector mounted on said second carriage for vertical and horizontal movement therewith, means for horizontally moving said first carriage, means for vertically moving said second carriage, and means for longitudinally moving said arm on said first carriage in proportion to vertical movement of said second carriage including a cable extending between said recording head and said second carriage and secured at one end to said recording head, a spring-loaded drum on said second carriage around which said cable is wound and which is spring loaded to wind the cable onto the drum, a releasable lock to lock said drum against rotation, whereby vertical movement of said second carriage imparts longitudinal movement to said arm in one direction, and spring means acting between said first carriage and said arm for urging the latter in the opposite longitudinal direction.

9. In a radiation scanner, the combination comprising:

a supporting frame, a horizontal table on said frame, a guide block on said frame, a carriage including a pair of slender, parallel rods horizontally slidable in and extending beyond opposite sides of said guide block,
a horizontal arm fixed to one end of said rods and extending transversely of the latter over said table,
a recording head on the end of said arm over said table,
a radiation detector connected to the other end of said rods for horizontal movement with said carriage,
a pair of rigid, horizontal guide tracks on said frame parallel to the direction of movement of said carriage,
a pair of guide members on said one end of said rods engaging in said guide tracks to support said one end of said rods for accurate horizontal movement of said recording head over said table, and
means for moving said carriage.

10. In a radiation scanner, the combination comprising:
a supporting frame,
a horizontal table on said frame,
a guide block supported on said frame for horizontal movement along a given direction line,
a carriage including a pair of slender, parallel rods horizontally slidable in and extending beyond opposite sides of said block at right angles to said direction line,
a horizontal arm fixed to one end of said rods and extending parallel to said direction line over said table,
a recording head on the end of said arm over said table,
a radiation detector connected to the other end of said rods for horizontal movement with said carriage,
a pair of rigid, horizontal guide tracks on said frame parallel to the direction of movement of said carriage,
a pair of guide members on said one end of said rods engaging in said guide track to support said one end of said rods for accurate horizontal movement of said recording head over said table,
means for moving said guide block, and
means for moving said carriage.

References Cited in the file of this patent

UNITED STATES PATENTS

| 2,036,097 | Pieper | Mar. 31, 1931 |
| 2,132,076 | Kotraschek et al. | Oct. 4, 1938 |
| 2,370,163 | Hare | Feb. 27, 1945 |
| 2,490,400 | Berggren | Dec. 6, 1949 |
| 2,894,140 | Schneeman | July 7, 1959 |
| 2,909,665 | Guentner et al. | Oct. 20, 1959 |

FOREIGN PATENTS

| 1,023,826 | Germany | Feb. 6, 1958 |
| 1,026,008 | Germany | Mar. 13, 1958 |

OTHER REFERENCES

"A Linear Scanner for Human Radioisotope Research," by A. C. Morris, Jr., Oak Ridge Inst. of Nuclear Studies, Oak Ridge, Tennessee, March 1960.